(12) United States Patent
Gorgenyi et al.

(10) Patent No.: US 10,965,743 B2
(45) Date of Patent: Mar. 30, 2021

(54) SYNCHRONIZED ANNOTATIONS IN FIXED DIGITAL DOCUMENTS

(71) Applicant: Microsoft Technology Licensing, LLC, Redmond, WA (US)

(72) Inventors: Frank Gorgenyi, Bremerton, WA (US); Kaustav Mukherjee, Hyderabad (IN); Neha Motghare, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 15/923,313

(22) Filed: Mar. 16, 2018

(65) Prior Publication Data

US 2019/0289070 A1    Sep. 19, 2019

(51) Int. Cl.
*H04L 29/08* (2006.01)
*G06F 17/21* (2006.01)
(Continued)

(52) U.S. Cl.
CPC ........ *H04L 67/1095* (2013.01); *G06F 40/106* (2020.01); *G06F 40/14* (2020.01);
(Continued)

(58) Field of Classification Search
CPC . H04L 67/1095; H04L 67/104; H04L 67/141; H04L 69/16; G06F 17/212; G06F 17/2247; G06F 3/04847; G06F 17/241
See application file for complete search history.

(56) References Cited

U.S. PATENT DOCUMENTS

| | | | |
|---|---|---|---|
| 7,119,266 B1 * | 10/2006 | Bittner | G09B 15/023 84/477 R |
| 2004/0088332 A1 * | 5/2004 | Lee | G06Q 10/10 |

(Continued)

FOREIGN PATENT DOCUMENTS

WO    0056055 A2    9/2000

OTHER PUBLICATIONS

Ford, et al., "Peer-to-Peer Communication Across Network Address Translators", In Proceedings of the USENIX Annual Technical Conference, Mar. 18, 2006, 14 Pages.
(Continued)

*Primary Examiner* — Soe Hlaing
(74) *Attorney, Agent, or Firm* — NovoTechIP International PLLC

(57) ABSTRACT

Techniques are described for receiving annotations in a fixed digital document on a first computing device and streaming them to multiple other computing devices that are connected to the first computing device using a peer-to-peer network. For example, a session may be established between the first computing device and a plurality of the other computing devices. Annotations may be received at the first computing device and streamed to the multiple other computing devices using the peer-to-peer network. For example, the annotations may include highlighting text in the fixed digital document, or electronic ink annotations made at a given location within the fixed digital document. These annotations may be streamed to the other computing devices in real-time, or at regular intervals, without requiring a cloud connection and without the need to save, close, and/or reopen the fixed digital document for the annotations to be received by the other computing devices.

20 Claims, 11 Drawing Sheets

(51) Int. Cl.
*G06F 17/22* (2006.01)
*G09B 5/10* (2006.01)
*G06F 40/14* (2020.01)
*G06F 40/106* (2020.01)
*H04L 29/06* (2006.01)
*G06F 3/0484* (2013.01)
*G06F 40/169* (2020.01)

(52) U.S. Cl.
CPC .............. *G09B 5/10* (2013.01); *H04L 67/104* (2013.01); *H04L 67/141* (2013.01); *G06F 3/04847* (2013.01); *G06F 40/169* (2020.01); *H04L 69/16* (2013.01)

(56) References Cited

U.S. PATENT DOCUMENTS

| | | | | |
|---|---|---|---|---|
| 2008/0168073 A1* | 7/2008 | Siegel | .................. | G06F 16/9562 |
| 2009/0154893 A1 | 6/2009 | Vasudevan et al. | | |
| 2010/0062796 A1* | 3/2010 | Hayton | ............. | H04M 1/72547 |
| | | | | 455/466 |
| 2011/0154192 A1* | 6/2011 | Yang | ................... | G06F 17/2288 |
| | | | | 715/256 |
| 2012/0060082 A1* | 3/2012 | Edala | .................... | G06F 17/241 |
| | | | | 715/231 |
| 2013/0103950 A1* | 4/2013 | Strahl | ..................... | G06F 21/33 |
| | | | | 713/185 |
| 2014/0006919 A1* | 1/2014 | He | ........................ | G06F 17/241 |
| | | | | 715/230 |
| 2014/0115436 A1* | 4/2014 | Beaver | ................ | G06F 17/2288 |
| | | | | 715/229 |
| 2015/0378995 A1* | 12/2015 | Brown | ................ | H04L 12/1827 |
| | | | | 707/608 |
| 2017/0257405 A1* | 9/2017 | Lo | ....................... | H04L 65/4015 |

OTHER PUBLICATIONS

"International Search Report and Written Opinion Issued in PCT Application No. PCT/US19/021509", dated May 17, 2019, 12 Pages.

* cited by examiner

SYNCHRONIZED ANNOTATIONS IN FIXED DIGITAL DOCUMENTS

BACKGROUND

Personal computing devices are increasingly being used in group environments, such as the classroom, to allow multiple users in the group to view the same digital document without having to use a screen and projector or other large-form multimedia device.

Additionally, a number of fixed digital document types, such as Portable Document Format documents ("PDFs"), permit users to add annotations to the document, using, e.g., text input, highlighting, electronic ink "pen" markings, etc. However, if a group leader (for example, a teacher) decides to annotate, for example, a PDF book with either highlighting, or other handwritten notes using electronic ink, the other members of the group (e.g., students) are not able to view it, because those changes are only made on the device of the person making the annotations.

Thus, allowing the other members of the group to see the annotations requires some sort of additional hardware to project these changes to a screen viewable by the others in the room, such as a video-camera projector that records the changes and projects them on, e.g., a white-board. However, this projection equipment can be costly, and also may not be as readily visible to those seated further from the screen as those sitting nearer the screen.

Additionally, even if the projection is visible to all in the room, if the other members of the group wish to replicate the leader's annotations in their own digital documents, they must physically replicate them while still trying to listen to what others in the room are saying, taking attention away from the discussion. Additionally, the process of members of the group transcribing digital document annotations made by the group leader involves duplication of effort, with the same annotations being made both by the person originally making the annotation, and the others in the room who are copying these annotations into their own digital documents. And, the possibility remains that the annotations will be replicated incorrectly, or that certain annotations will be missed as the discussion continues.

Therefore, there exists an opportunity to improve technologies for synchronizing annotations between fixed digital documents on multiple users' computing devices in real-time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for synchronizing annotations between fixed digital documents on different computing systems in real time.

For example, a peer-to-peer network can be created to connect a first computing device to a plurality of other computing devices. A fixed digital document can be displayed, and annotations to the fixed digital documents can be received, with the annotations anchored to a specific location of the fixed digital document. The annotations can be streamed via the peer-to-peer network connection to the other computing devices, and synchronized, in real-time, at the other computing devices to corresponding fixed digital documents displayed at the other computing devices.

As another example, a computer-implemented method may be provided for synchronizing annotations to fixed digital documents between computing devices. The method may comprise creating a peer-to-peer network connection from the computing device to a plurality of other computing devices, displaying a fixed digital document, receiving an annotation to the fixed digital document, wherein the annotation is anchored to a specific location of the fixed digital document, and streaming, via the peer-to-peer network connection, the annotation to the other computing devices, wherein the annotation is synchronized, in real-time, at the other computing devices to corresponding fixed digital documents displayed at the other computing devices.

As another example, computing devices comprising processing units and memory can be provided for performing the operations described herein. For example, a computing device can connect via a peer-to-peer network to a plurality of other computing devices, display a fixed digital document, receive an annotation to the fixed digital document, wherein the annotation is anchored to a specific location of the fixed digital document, stream, via the peer-to-peer network connection, the annotation to the other computing devices, such that the annotation is synchronized, in real-time, at the other computing devices to corresponding fixed digital documents displayed at the other computing devices.

As described herein, a variety of other features and advantages can be incorporated into the technologies as desired.

The foregoing and other objects, features, and advantages of the invention will become more apparent from the following detailed description, which proceeds with reference to the accompanying figures.

DETAILED DESCRIPTION

Overview

As described herein, various techniques and solutions can be applied for synchronizing annotations in fixed digital documents between computers in a peer-to-peer network.

For example, an entire room, such as a school classroom can be brought into a single "session," during which the devices of all members of the group will be tethered to that of a leader's device, such as a teacher's computer, so that any annotation done by, e.g., the teacher is replicated in real time to the devices of the students. In this manner, students can continue to listen to what the teacher is saying while the annotations auto-apply themselves on the fixed digital document, such as a textbook.

First, it may be helpful to differentiate between fixed digital documents (or "fixed-layout" documents), as that term is used herein, and other types of digital documents. A reflowable digital document is typically understood to be a document that can adapt its presentation to the output device. So, Microsoft® Word documents, for example, can adapt to change the presentation of the words on a page depending on the view that a user has selected for his given device, or to appear differently on different devices. Typical prepress or fixed digital document types having a fixed layout, such as PostScript or PDF are not reflowable during the presentation process, because the page itself is not resized. While the view of the page may change, the actual location of the words on a given page typically does not change.

There are existing solutions for offline synchronization of, e.g., PDF documents, wherein the documents can be updated after they are saved with changes made by other users. However, these solutions do not provide for real-time synchronization while a given fixed digital document is open, and solutions that rely on this type of synchronization also risk overwriting any changes made by other users on previous versions of the document, such as student annotations in their versions of a digital textbook.

Figure 1:
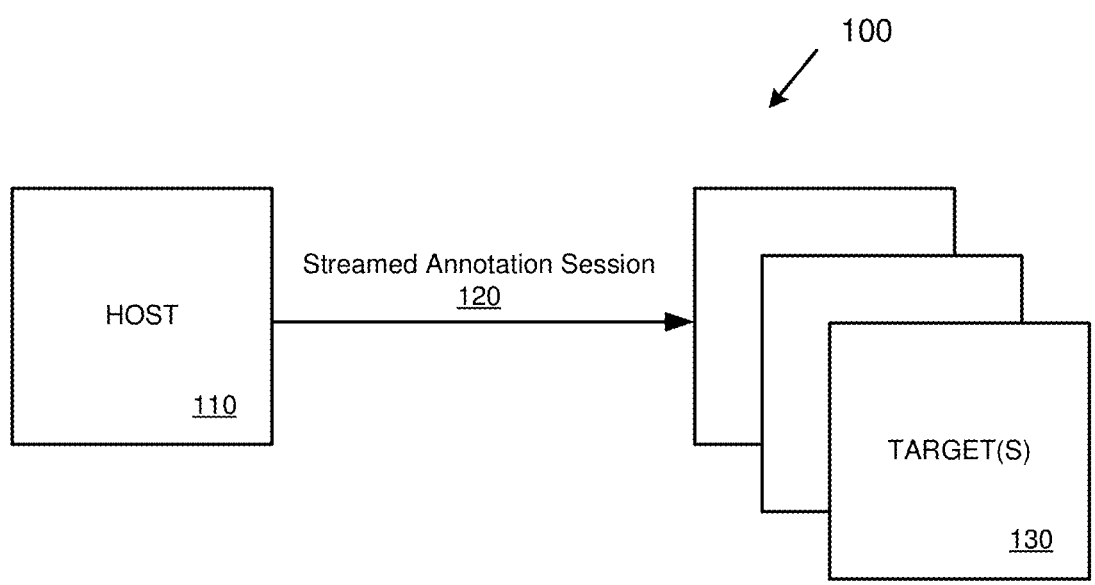
FIG. 1 is an example diagram depicting streaming annotations to a fixed digital document from a host computing system to a plurality of target computing systems.

FIG. 1 is an example block diagram 100 depicting streaming synchronized changes to a fixed digital document from a first computing system, sometimes called the host computing system (or "host") to a plurality of target computing systems or ("targets"). In the example diagram 100, annotations are input to a fixed digital document situated on a host computer 110. For example, handwritten "digital ink" annotations may be made to a first document situated on a host computer. These annotations can then be streamed from the host computer 110 to one or more target computers 130 via a streamed annotation session 120.

Figure 2:
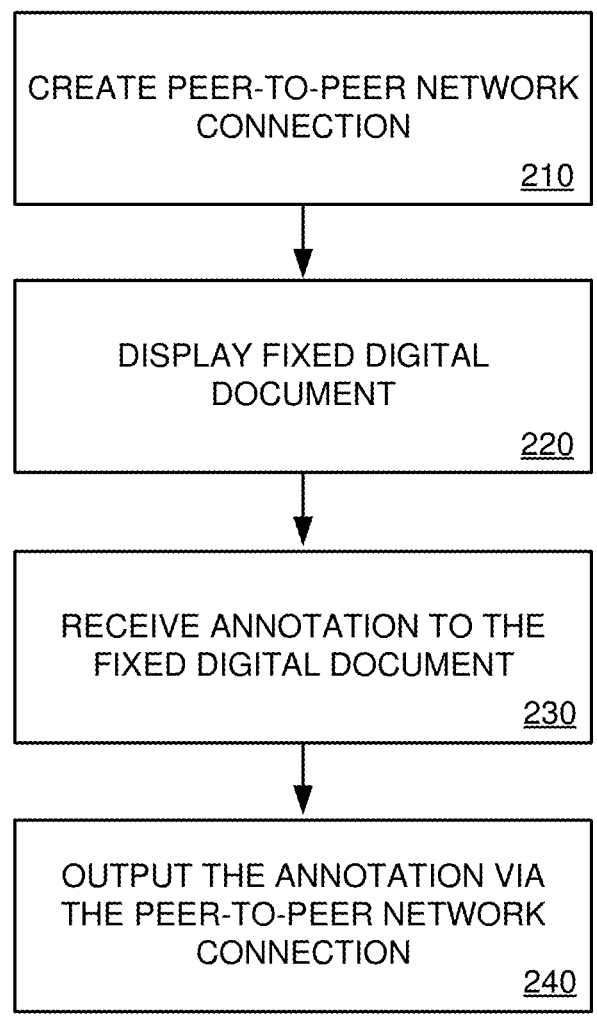
FIG. 2 is a flowchart of an example method for synchronizing annotations to a fixed digital document from a host computer to one or more target computers.

FIG. 2 is a flowchart of an example method 200 for streaming synchronized annotations from a host computer to one or more target computers. The example method 200 can be performed, at least in part, by a computing device.

Figure 3:
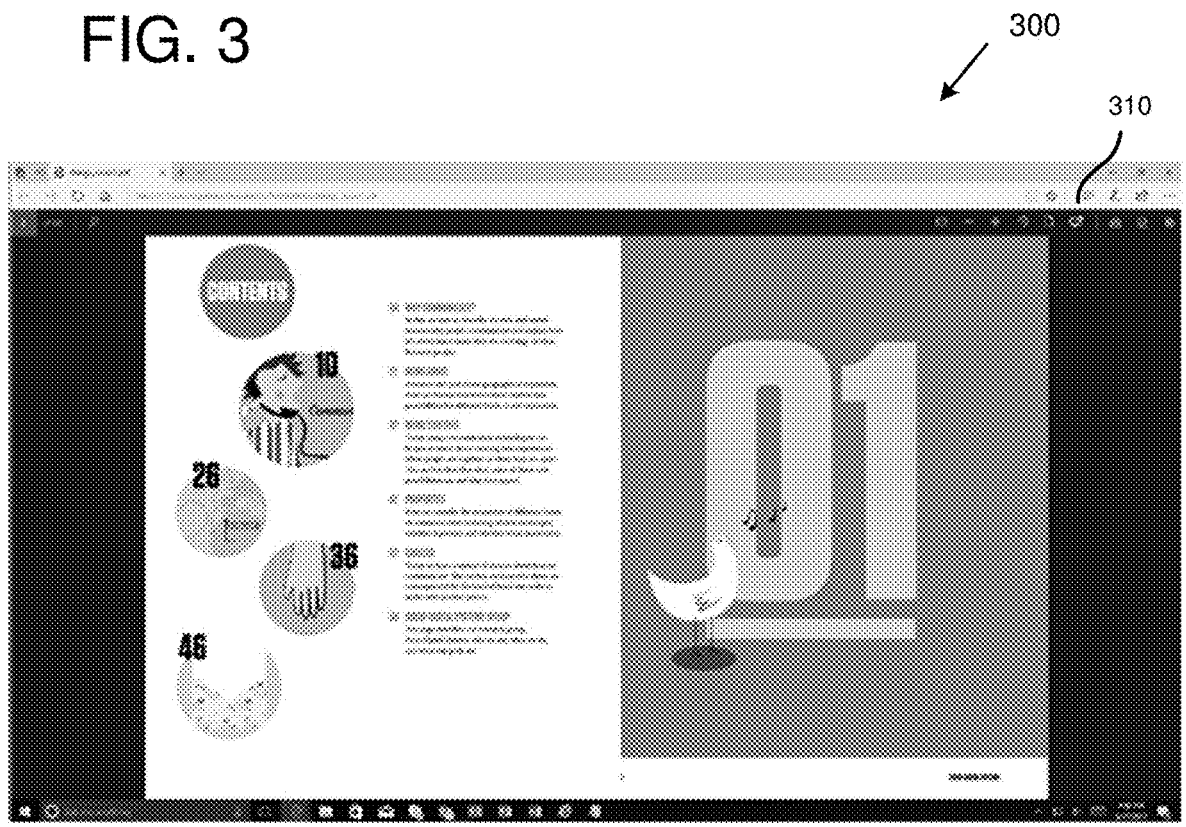
FIG. 3 is an illustration of a first browser window that may be used with the synchronized annotations of this disclosure.
Figure 4:
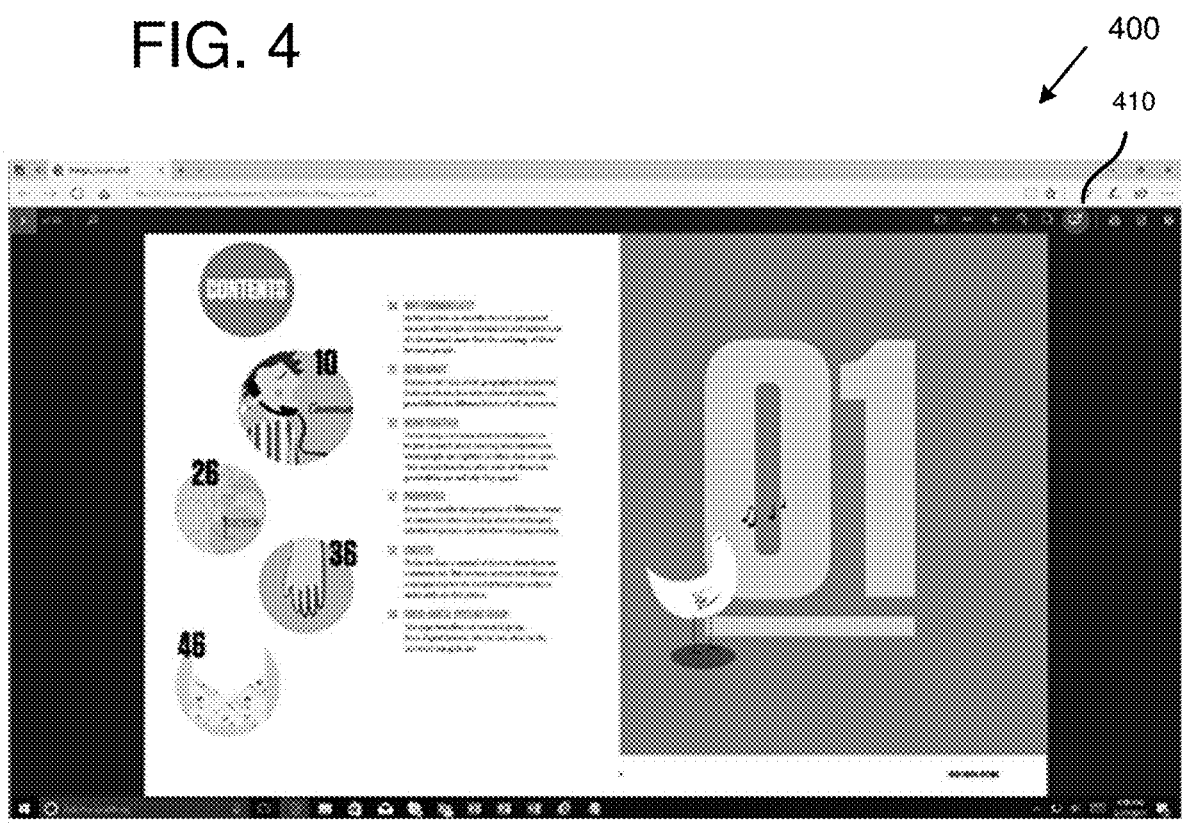
FIG. 4 is an illustration of a second browser window that may be used with the synchronized annotations of this disclosure.
Figure 5:
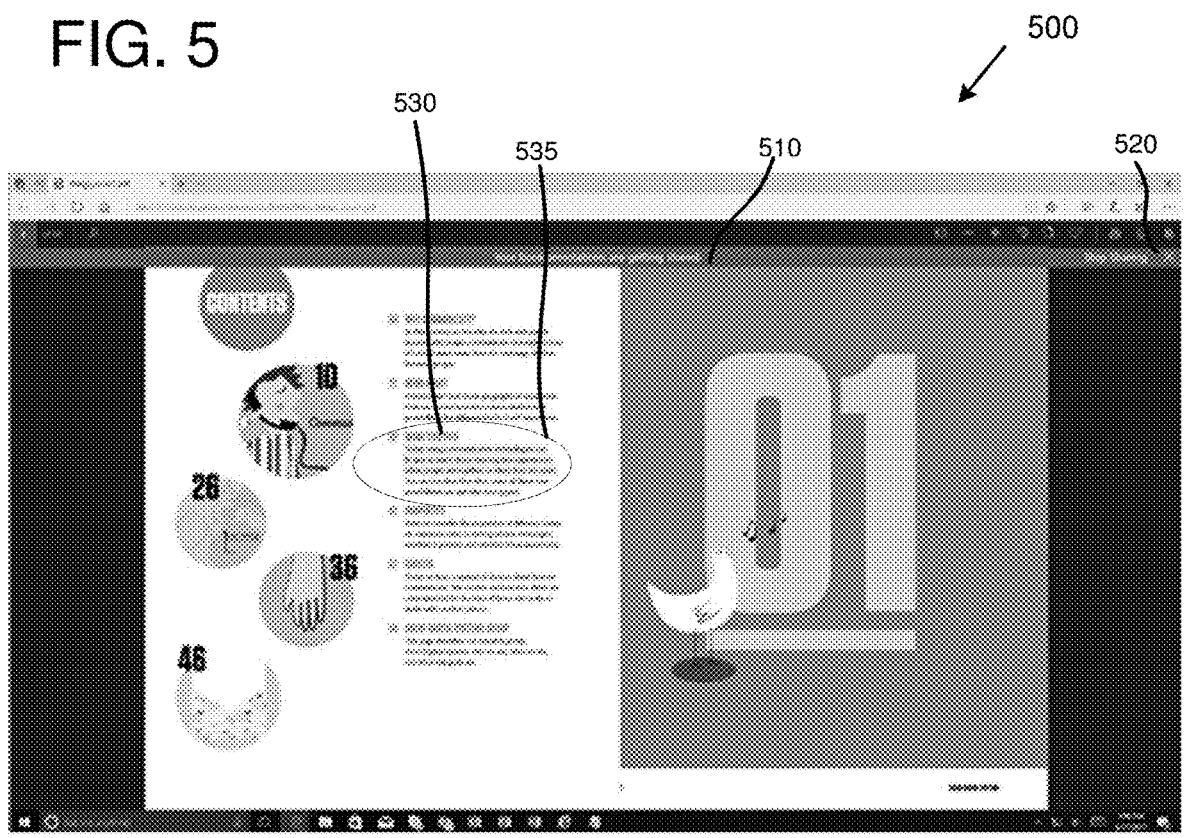
FIG. 5 is an illustration of a third browser window that may be used with the synchronized annotations of this disclosure.

At 210, a peer-to-peer network connection is established between a host computer and one or more target computers. Examples of peer-to-peer network connections may be a user datagram protocol ("UDP") connection or a Bluetooth connection, though other types of peer-to-peer connections may also be used with the methods of this disclosure. A peer-to-peer network connection allows a direct connection between end-user computing devices that does not require a separate server, or even an external Internet connection, to operate. Annotations can be synchronized between and among the various computing devices described in this disclosure using the peer-to-peer connections without requiring an Internet connection. For example, a user of the host computer may open a fixed digital document on the host computer, e.g., in a window of a browser, such as a Microsoft Edge® browser. In some embodiments, such as illustrated in FIG. 3, a browser window 300 may provide a prompt, such as a selectable sharing icon 310 or an option within a selectable menu (not shown), that triggers the browser to start sharing content. As illustrated in FIG. 4, in a browser window 400, a user may select an option, such as a selectable icon 410 or other prompt, to begin sharing content. Additionally, in some embodiments, and as illustrated in FIG. 5, a user may be provided a reminder 510 in a browser window 510 that annotations are being shared. Additionally, the user may be provided with an option to stop sharing content, such as by deselecting an icon associated with sharing, or by selecting an option to stop sharing from, e.g., a selection menu 520.

At 220, a fixed digital document is displayed on the host computer, an example of which is shown in FIGS. 4 to 5. The example of a PDF is used herein, but it is to be understood that the disclosed techniques may be used with other fixed digital document types, as well. Some examples of such fixed digital documents which permit annotations are Open XML Paper Specification ("OpenXPS") documents and DjVu documents, though any fixed document format that permits annotations anchored to specific locations within the document may be used with the methods of this disclosure.

At 230, an annotation to the fixed digital document is received, e.g., at a host computer, as illustrated in FIG. 5. This annotation may comprise a highlight annotation 530, which may include highlighting some or all of the text indicated by selection oval 535, or one or more other annotations such as digital text annotations or digital ink annotations (not shown) to the fixed digital document displayed on the host computer. When using the techniques described herein within a browser implementation, it is necessary that the browser is configured to support annotations. The Microsoft Edge® browser, for example, permits a user to not only enter electronic ink annotations, but also to highlight text, and to enter text annotations, as well, in addition to some additional options for further annotations, such as inserting images or other graphics. Examples of providing electronic inking to Web-based documents are provided, for example, in U.S. Pat. No. 6,859,909, which is incorporated herein by reference. Additional description of providing annotations to fixed digital documents that may be displayed in a browser, such as PDF documents, is provided herein. Exemplary images of browser windows provided herein are from the Microsoft Edge® browser, but it is understood that other browsers supporting electronic inking of fixed digital documents could also be programmed to be used in conjunction with the techniques described herein.

One advantage of fixed digital documents such as those described herein is that they facilitate the process of "anchoring" annotations to a specific location on a given page or in a given section within the document. For example, if a user wishes to highlight the page, such as indicated by a highlight annotation 530 in FIG. 5, which indicates highlighting some or all of the text indicated by selection oval 535, highlight annotation 530 may begin at specific XY coordinates on the page. Because the document format is fixed, a user who begins highlighting a word on the page can view this same annotation later in this same document in the same way it was originally rendered, regardless of the type or size of the computer display or viewing window on the display in which this document is viewed. So, if an annotation is "anchored," e.g., at a particular location corresponding to an X coordinate of 37 and a Y coordinate of 45, that same anchor will be associated with this annotation within this digital document regardless of the specific manner in which the document is later displayed.

In an exemplary embodiment, the host computer receives information about the document to be annotated, which may be transferred to the target computers to assist with translating the annotations and rendering them on the target computers. Examples of this information follow.

First, a user on the host computer may enter, or the sharing computer may recognize, a document ID (or "book ID") that identifies the document in which the annotations are to be made. For example, a book ID may be specified at a source location for a document, such as in the Microsoft® store, e.g., for a document that may be purchased by an organization such as a school. In certain embodiments, an administrator setting up an environment for a given group, such as for a given school course taught by a specific teacher or multiple teachers (the example of a classroom environment is used herein, though it is understood that similar approaches may be used in other groups where document sharing is beneficial, such as work meetings, church gatherings, book clubs, etc.) may assign a book ID to the teacher(s) for the course, as well as to the enrolled students, or in some cases to specific devices assigned to a given teacher or course.

Second, the host computer receives information identifying the page number of the document currently open on which annotations are being entered.

Third, the host computer may receive information regarding the current zoom level of the current page, along with the horizontal and vertical scroll positions (e.g., "offsets") of the page. For example, if the page is not zoomed at all, and fits entirely within the viewport, the zoom level might be set at 1, would be 1, and the offsets would be 0. This information may help in identifying the exact coordinates at which any annotation is triggered.

Fourth, the host computer may receive annotation specific information.

For example, if, an annotation action, such as an ink annotation action is triggered (such as by a mouse action, via finger on a touchscreen, via pen on a Surface device, or other suitable indications on input devices), the coordinates within the page within which it is being rendered, are converted into a format suitable for transmission, e.g., encoded into base64 encoded strings, which can then be transferred to the target computers. While encoding using base64 encoded strings is disclosed, it is to be understood that other data encoding may also be used with the techniques described herein, such as base122 or other well-defined encoding-decoding scheme. Additionally, for an ink annotation, the current ink settings—color, stroke width (or font size), etc. for the specific ink annotation being made (e.g., highlight or digital ink annotation) are also received.

If a text annotation is being made—such as by using a "note taking" function, e.g., as specified within the PDF specification—the coordinates where the note-taking action was invoked is received. And, subsequently, as notes are taken, e.g., in a textbox displayed on, e.g., a PDF user interface "UI" that is associated with a note-taking function, the host computer also receives information regarding the text being typed and related information, such as font size, color, etc., and the size of the text box in which the data is entered. Once the annotation is complete, (e.g., by clicking a "Submit" button that may pop up with a given text window), information specifying that the information is complete may also be received, so that the post note-taking UI may automatically synchronize with the target computers.

If a highlight annotation is received, as in FIG. 5, the host computer receives the position of the text being highlighted, and the color of the highlight. Identifying the position of the text (or other annotation) may utilize, e.g., XY coordinates for the beginning of the text and corresponding XY coordinates for the end of the highlighted text, or may instead provide information about a start position and the number of characters being highlighted. A PDF, for example, does not generally utilize the concept of a line or word, but rather may have streams of text, sometimes known as runs. Words and lines may be heuristic-based constructs that a given application (such as Microsoft Edge®) creates for a user's ease of reading. So, any particular text location in, e.g., a PDF may be specified in terms of given parameters like run-number, character index and coordinates, and calculated parameters, like line number. So, in a typical example, text location may be marked by 4 parameters: 1) page number, as discussed above; 2) line number, which as discussed above may be calculated based on a number of additional heuristics about the screen, such as the XY coordinates, zoom level, offsets, etc.; 3) run-number, and 4) character index. Alternatively, page location may be specified using a fixed location specified in another manner, such as, e.g., a Named Destination in a PDF file or a LinkTarget in an Open Publication Structure ("OPS") document. Other fixed document locations may be used, as well.

Fifth, the host computer may receive information regarding a destination action, such as clicking an internal link to move to another location in the document, clicking a Table of Contents entry, navigating to another page using scroll bars, or by mouse movements, or manually entering a page-number, or using another similar method to navigate within the document. In each of these cases, the destination page-number to receive potential annotations is received, and may be provided as a preliminary step in receiving additional annotations on the new destination page, which may subsequently be synchronized to target computers. Thus, in cases where a first annotation is made on a first page, destination information may be received which triggers the display to move to a second page location—either a different location on the page, or perhaps a different page entirely—where annotations may then be entered. Thus, the target computers may then be triggered to display this second page location, and any subsequent annotations entered thereon.

At 240, the annotation is output via the peer-to-peer network connection to one or more target computers. An exemplary process for streaming annotations via a peer-to-peer network connection to one or more target computers is described herein in more detail. For example, in a UDP environment, an administrator may determine a base location, such as an IP address (e.g., BASE_IP) to send out notifications via a local network, such as a local WiFi network. Other computers connected to the local network may be configured to listen for such notifications. While a WiFi connection is described, it is understood that other local peer-to-peer connections may be used with the techniques described herein.

Figure 6:
FIG. 6 is an illustration of a fourth browser window that may be used with the synchronized annotations of this disclosure.

An exemplary setup for establishing the BASE_IP endpoint for sending and receiving such notifications over the local network using the UDP protocol is set forth below:

UdpClient client=new UdpClient( )
    IPEndPoint ip=new IPEndPoint(IPAddress.Parse(BASE_IP), PORT_NUMBER);
        byte[ ] bytes=Encoding.ASCII.GetBytes(message);
        client.Send(bytes, bytes.Length, ip);
        client.Close( );

As illustrated in FIG. 6, when another computer connected to the same WiFi network that is configured to listen to such UDP requests from the IP address BASE_IP receives such a message, it may generate a notification 610 to be displayed, e.g., on a display 600 on the target computer, the notification 610 inviting the user to connect to a specific UDP session in which a fixed digital document is being shared by another user. In certain embodiments, as illustrated, a preview of the shared fixed digital document may also be included. In some embodiments, the user may be provided an option to reject the invitation, such as by clicking on a Reject button 630, or another user-selectable prompt. On the other hand, if the user chooses to accept the invitation, such as by clicking on an Accept button 620 or other user-selectable prompt, the browser may be directed to listen to requests from a second location, such as a second IP address from which annotation synchronization requests may be generated (e.g., SYNCHRONIZATION_IP). Exemplary code for setting up the listening operation is set forth below:

```
private readonly UdpClient udp = new UdpClient (PORT_NUMBER);
IAsyncResult ar_ = null;
private void StartListening ( )
  {
    ar_ = udp.BeginReceive(Receive, new object( ));
  }
private void Receive(IAsyncResult ar)
  {
IPEndPoint ip = new IPEndPoint(Annotation_IP, PORT_NUMBER);
byte [ ] bytes = udp.EndReceive(ar, ref ip);
string message = Encoding.ASCII.GetString (bytes);
    Console.WriteLine("From {0} received: {1} ",ip.Address.ToString( ), message);
    StartListening ( );
  }
```

Once the device that is sharing its content begins to receive annotations in the fixed digital document open in the browser, the annotations are first serialized into JSON data and, when content is being shared as described above, the same serialized data is streamed to the target computers, e.g., via UDP, so that the annotations can be synchronized in fixed digital documents situated on those devices. Exemplary code for performing this operation is set forth below:

```
      Public void Send(string message)
         {
      UdpClient client = new UdpClient ( );
      IPEndPoint ip = new IPEndPoint (IPAddress.Parse(BASE_IP), PORT_NUMBER);
      byte [ ] bytes = Encloding.ASCII.GetBytes (message);
        client.Send(bytes, bytes.Length, ip);
        client.close( );
        Console.WriteLine ("Sent: {0} ", message);
         }
```

In order to be able to synchronize the annotations in such a manner that they can be displayed on the target computers, it is important to provide data that accurately represents the annotations, which may comprise the data received by the host computer, as described above. Some examples of data that may be included follow. For example, the location at which the annotations are "anchored" may be first provided. This may include an identification of a specific fixed digital document, a page number within the fixed digital document, and x and y coordinates and/or line number corresponding to the annotation. In some cases, information is provided regarding where the annotation begins, and in particular embodiments, information may also be provided regarding where the annotation ends. Additionally, information may be provided regarding the type of annotation (e.g., highlight or digital ink annotation) and in some cases the size of the annotation (e.g., width and/or height of the annotation, or number of characters for the annotation). In certain embodiments, additional information may be provided, such as the scaling factor (e.g. a "zoom level") of a page on which the annotation is entered, scrolling location information regarding which portion of the page is being displayed on the first computing device, which may comprise vertical and/or horizontal scrolling information, and/or information regarding the specific size of the viewport being used to display the fixed digital document, and/or the percentage of the viewport that is occupied by the fixed digital document being displayed.

A sample JSON payload for a given annotation may resemble the following:

```
{
"id": "A564gd&@",
"page": 45,
"type": "highlight",
"topX": 45,
"topY": 12,
"width": 123,
"height": 34
}
```

In some particular embodiments, annotation data for a given copy of a fixed digital document stored on a given device may be entered on a first layer of the document, which can optionally be stored locally or synced to a cloud server, so that the next time the same user of that same device opens the fixed digital document again in the same browser, the annotations made on this first layer appear intact. Additionally, annotations received from another user that is sharing their document may be entered on a second layer of the document and either stored locally, or optionally synced to a cloud server, so that these annotations are also retained in the document. Because shared annotations are entered and stored separately on a second layer that is distinct from annotations entered on a given copy of the fixed digital document, only those annotations which are meant to be shared between, e.g., a host computer and target computers may be shared with those target computers, while other "unshared" annotations—including annotations made to copies of fixed digital documents that reside on target computers that may be received at the target computers themselves—are not shared with other computers.

Once a synchronization request is sent out, it is received by the target computers which have been configured to receive such requests. Once the message is received, it is deserialized and (if provided) its "id" attribute value is obtained. This "id" attribute may be used by the browser to determine which of the fixed digital documents that are open or may be opened using that browser on that target computer match that id. If a match exists, the annotation is directly applied to that fixed digital document according to the specified instructions, such as instructions regarding page number, location, type of annotation, etc., as further described below. In this way, the annotation received at the host computer in the fixed digital document PDF book may be applied directly and automatically to each of the target computers, and the users of these devices can see the same annotations on their devices, without having to manually enter them themselves.

The process for the target computers receiving streamed annotation data from the host computer is similar to the process described above by which the host computer itself receives annotation information.

First, the target computer may receive the document ID for the fixed digital document being annotated. At this stage, the target computer may check to see whether the application being used to open the fixed digital document—such as a Microsoft Edge® browser being used to view an annotated PDF device—is open. If the document is open, and if synchronizing content is permitted at the target computer, e.g., by a user responding to a notification 610 regarding shared content by accepting an invitation to connect, as described above with reference to FIG. 6, then synchronization of annotations received on the host computer can proceed.

Second, the target computer receives page number information regarding the page of, e.g., the PDF, that is open on the host computer, so that it can be matched to the target computer, so that any page-specific actions taken on the host computer, such as electronic inking, highlighting or entering an electronic note can be immediately synced over to the corresponding page on the target computer.

Third, the target computer receives information regarding, e.g., changes in the zoom level and scroll offsets to the page being rendered on a display of the host computer, so that annotations can be properly synchronized to the target computer. In some embodiments, as discussed more fully below, this information about page location may be separately streamed, and a trigger provided so that the target computer may navigate directly to the same page location and view as used by the target computer, so that the displays themselves are synchronized, in addition to the annotations contained on the page being synchronized. In this way, the "snapshots" of the page displayed on the host computer and the target computers may be synchronized, as further discussed below. In other embodiments, the page view on the target computer may not change, but because the information on page location and annotation-specific information are received at the target computer, they can be properly applied to the appropriate location in the document open on the target computer that corresponds to the location at which they were entered in the document open on the host computer, so that when the document on the target computer is navigated to a location corresponding to an annotation made on the host computer, that annotation is visible on the target computer in real-time.

Fourth, the target computer may receive the annotation specific information described above, such as specific location, type of annotation, etc., similar to the information received by the host computer, as described above.

For example, if, an annotation action, such as an ink annotation action is triggered (such as by a mouse action, via finger on a touchscreen, via pen on a Surface device, or other suitable indications on input devices), the coordinates within the page within which it is being rendered, to be converted into a base64 encoded string are received and can be transferred to the target computers. Additionally, for an ink annotation, the current ink settings—color, stroke width (or font size), etc. for the specific ink annotation being made (e.g., highlight or digital ink annotation) are also received.

If a text annotation is being made—such as by using a "note taking" function, e.g., as specified within the PDF specification—the coordinates where the note taking action was invoked is received. And, subsequently, as notes are taken, e.g., in a textbox displayed on, e.g., a PDF user interface "UI" that is associated with a note taking function, the target computer also receives information regarding the text being typed and related information, such as font size, color, etc, and the size of the text box in which the data is entered. Once the annotation is complete, (e.g., by clicking a "Submit" button that may pop up with a given text window), information specifying that the information is complete may also be received, so that the post note-taking UI may automatically synchronize with the target computers.

If a highlight annotation is received, as in FIG. 5, the target computer receives the position of the text being highlighted, and the color of the highlight. Identifying the position of the text (or other annotation) may utilize, e.g., XY coordinates for the beginning of the text and corresponding XY coordinates for the end of the highlighted text, or may instead provide information about a start position and the number of characters being highlighted. So, in a typical example, text location may be marked by 4 parameters: 1) page number, as discussed above; 2) line number, which as discussed above may be calculated based on a number of additional heuristics about the screen, such as the XY coordinates, zoom level, offsets, etc.; 3) run-number, and 4) character index. Alternatively, page location may be specified using a fixed location specified in another manner, such as, e.g., a Named Destination in a PDF file or a LinkTarget in an OPS document. Other fixed document locations may be used, as well.

Fifth, the target computer may receive information regarding a destination action taken on the host computer, as described above, such as clicking an internal link to move to another location in the document, clicking a Table of Contents entry, navigating to another page using scroll bars, or by mouse movements, or manually entering a page-number, or using another similar method to navigate within the document. In each of these cases, the destination page-number to receive potential annotations is received, and may be provided as a preliminary step in receiving additional annotations on the new destination page. As the zoom level and scroll offsets change in the master device, the same is synced and applied programmatically to render annotations to the same book open in the target computer, as well. In some embodiments, the document open on the target computer may be triggered to immediately navigate to the same page view with the same zoom level and offsets as on the host computer, so that the two devices contain the exact same snapshot at any point in time. In this manner, the target computer may navigate from a first page location at which first annotations are being made, to a subsequent page location—either on the same page or a different page— where additional annotations are being made on a host computer. In some embodiments, the user of the target computer may be permitted to scroll away from this view, and can be triggered to return only when additional annotations are received on the host computer. In still other embodiments, navigation on the target computers may be performed entirely manually, so that while annotations are synchronized in real-time, the target and host computers need not display the same page "snapshot." For example, in particular implementations, a user interface may provide an option for a target computer user to "disconnect" from a host computer, so that while annotations are synced, navigations are not, allowing the user to independently navigate the document being synced. In such cases, the target computer may simply ignore any navigation event data that is coming from the host computer.

Once the required page and annotation information is received, and once the ink information payload comes, the base64 encoded image for the annotation is converted to the actual image and added to the display instructions for the image on the screen on the target computer.

In embodiments where the snapshots of the host computer and target computers are synchronized, by the third step described above, the snapshots of the pages displayed on the host computer and the target computer are the same. In these cases, where specific annotation information is thereafter received at the host computer, the annotation image is applied in real-time at the exact same coordinates on the target computer (since these coordinates are also synced) as this annotation information was received at the host computer.

In some embodiments, the annotation is synced as a given gesture is completed, such as an ink gesture, while in other embodiments, e.g., text input using the note function in PDF, the information is synced continuously as it is being typed. In the latter case, the annotation text remains the same in both the host computer and target computer as the teacher goes on typing. Since the position at which, e.g., the note popup is showing in a PDF is the same on both the host and target computers, and the information being entered at the host computer at this location is also synced, the snapshot for the page image at both the target and the host computer is the same.

As discussed above, in those cases where same page-navigation is triggered, when a new destination action is taken at the host computer, the target computer may immediately navigate to the same location. So, in one example where a teacher says, "Now let's go to page 41 and see what we have got there," and enters 41 in a page-number text input box and presses Enter, the target computer would immediately navigate its display to the same page number, and display it at the same zoom-level and offset as on the host computer display. From there, as annotations are added to the document open on the host computer, the target computer would mirror these, and the snapshot of the displays on the two devices would remain synchronized.

The example method 200 can be used to synchronize annotations in real time, such as each time an individual annotation is made. Alternatively, the example method 200 can be used to synchronize annotations at regular intervals (e.g., on a periodic basis, such as every 10 seconds).

Figure 7:
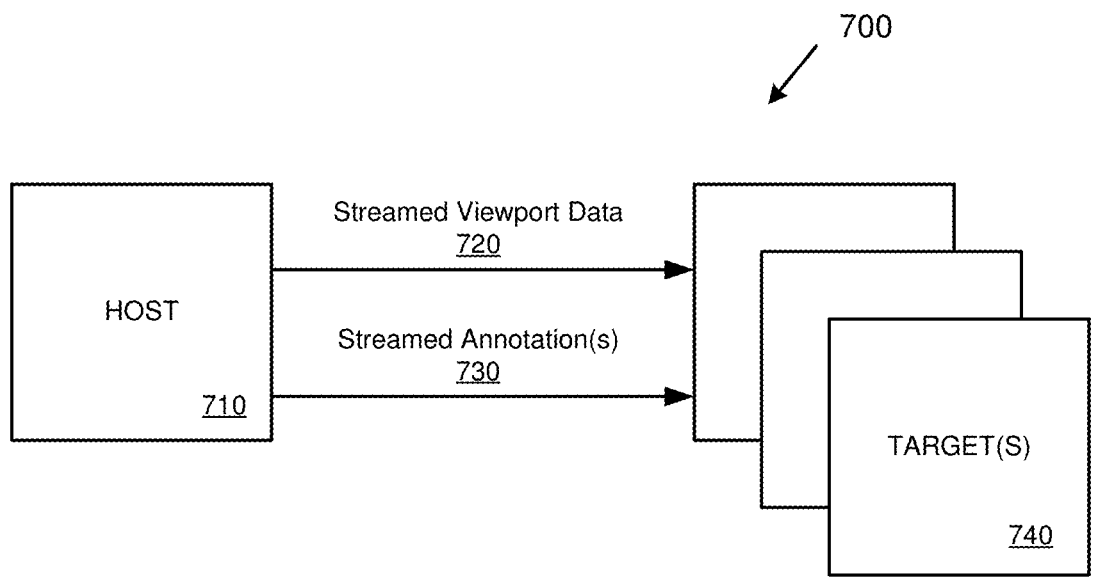
FIG. 7 is another example diagram depicting streaming annotations to a fixed digital document from a host computing system to a plurality of target computing systems.

FIG. 7 is an example block diagram 700 depicting another embodiment of streaming synchronized changes to a fixed digital document from a host 710 to a plurality of targets 740. In the example diagram 700, annotations are input to a fixed digital document situated on a host computer 710. For example, one or more handwritten "digital ink" annotations may be made to a first document situated on a host computer. These annotations can then be streamed from the host 710 to one or more target computers 740 via a streamed annotation session. The session may include two streams, a first stream 720 for streaming viewport data, such as the zoom level and offsets described above, and a second stream 730 containing information regarding the annotation(s) themselves. Thus, annotations made at the host 710 can be synchronized to the targets, while the specific page locations on which the annotations are made can also be synchronized, permitting annotations to be viewed at the targets 740 in a display having the same "snapshot" as the display on which the annotations were entered at the host 710.

Figure 8:
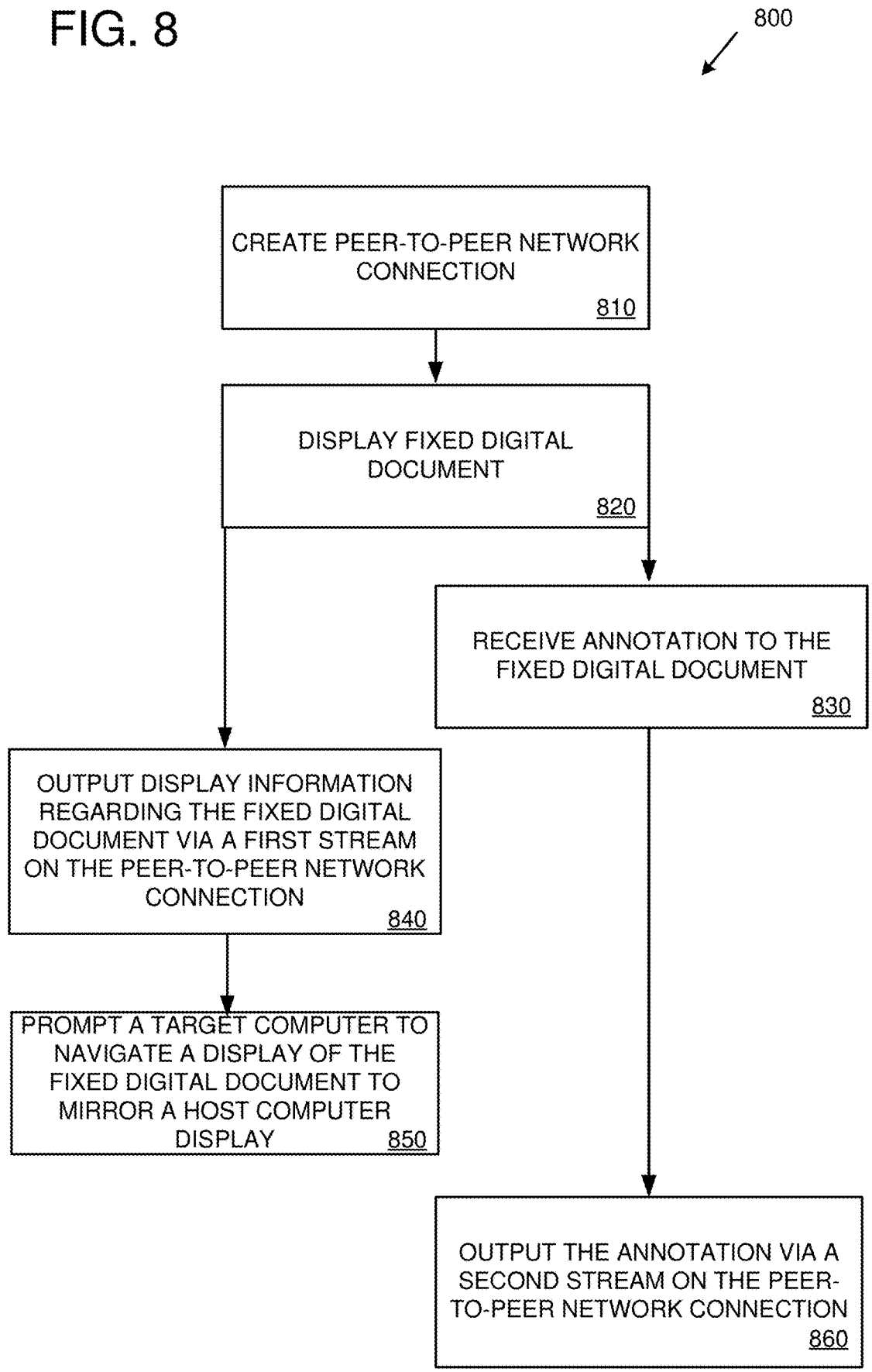
FIG. 8 is a flowchart of another example method for synchronizing annotations to a fixed digital document from a host computer to one or more target computers.

FIG. 8 is a flowchart of another example method 800 for streaming synchronized annotations from a host computer to one or more target computers. The example method 800 can be performed, at least in part, by a computing device.

At 810, a peer-to-peer network connection is established between a host computer and one or more target computers, similar to the connection 210 described above with reference to FIG. 2.

At 820, a fixed digital document is displayed on the host computer, as shown in FIGS. 4 and 5, above, and similar to the similar description of the display step 220, above.

At 830, the host computer receives an annotation such as, for example, a highlight annotation such as highlight annotation 530 as illustrated in FIG. 5, or digital text annotations or digital ink annotations (not shown) to the fixed digital document displayed on the host computer. Information about this annotation may be similar to that received above in step 230.

At 840, display information regarding the "snapshot" of the fixed digital document displayed on a host computer may be output via a first stream on the peer-to-peer network connection. This may include, e.g., page number information regarding the page of the fixed digital document that is open on the host computer. This may also include information regarding, e.g., changes in the zoom level and scroll offsets to the page being rendered on a display of the host computer, so that annotations can be properly synchronized to the target computer.

At 850, a prompt may be sent to a target computer so that it can immediately navigate to the location in a shared document corresponding to the page display information. Thus, the target computer may navigate to a page location and view such that its display of the shared fixed digital document mirrors that of—and is synchronized to—the display of the same fixed digital document being annotated on the host computer. In this way, the "snapshots" of the pages displayed on the host computer and the target computers may be synchronized, even as annotations are received on the host computer.

At 860, the annotation information is output via the peer-to-peer network connection to one or more target computers via a second stream on the peer-to-peer network connection. This second stream may be similar to the stream provided at step 240, described above Once the required page information and annotation information are received, and once the ink information payload comes, the base64 encoded image for the annotation is converted to the actual image and added to the display instructions for the image on the screen on the target computer.

In embodiments where the snapshots of the host computer and target computers are synchronized, by step 840 described above, the snapshots of the pages displayed on the host computer and the target computer are the same. In these cases, where specific annotation information is thereafter received at the host computer, the annotation image is applied in real-time at the exact same coordinates on the target computer (since these coordinates are also synced) as this annotation information was received at the host computer.

In other implementations, other techniques can be employed to synchronize annotations between fixed digital documents.

Computing Systems

Figure 9:
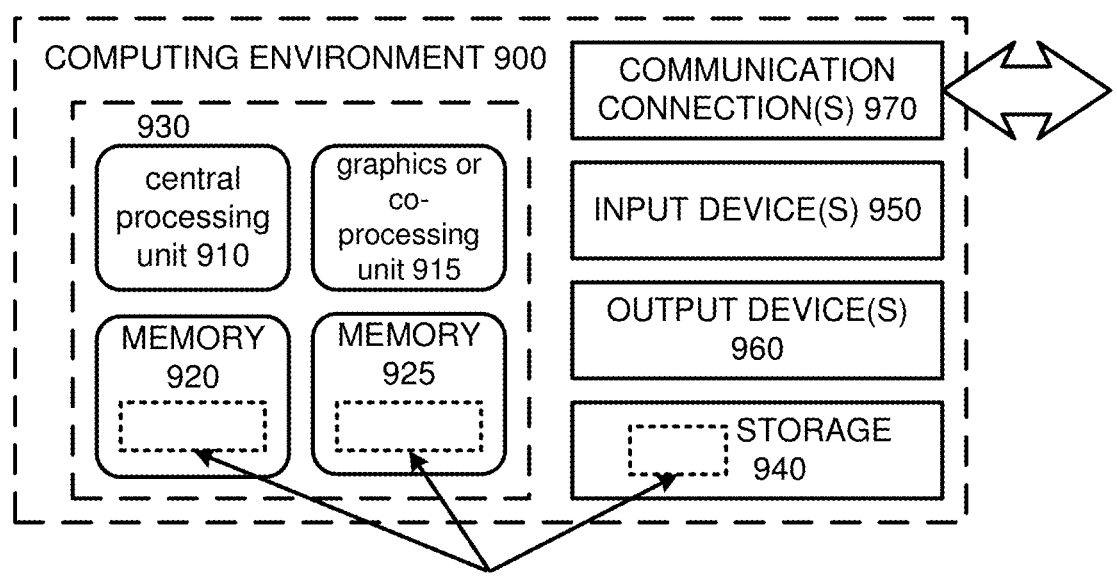
FIG. 9 is a diagram of an example computing system in which some described embodiments can be implemented.

FIG. 9 depicts a generalized example of a suitable computing system 900 in which the described technologies may be implemented. The computing system 900 is not intended to suggest any limitation as to scope of use or functionality, as the technologies may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more technologies described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more technologies described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 10:
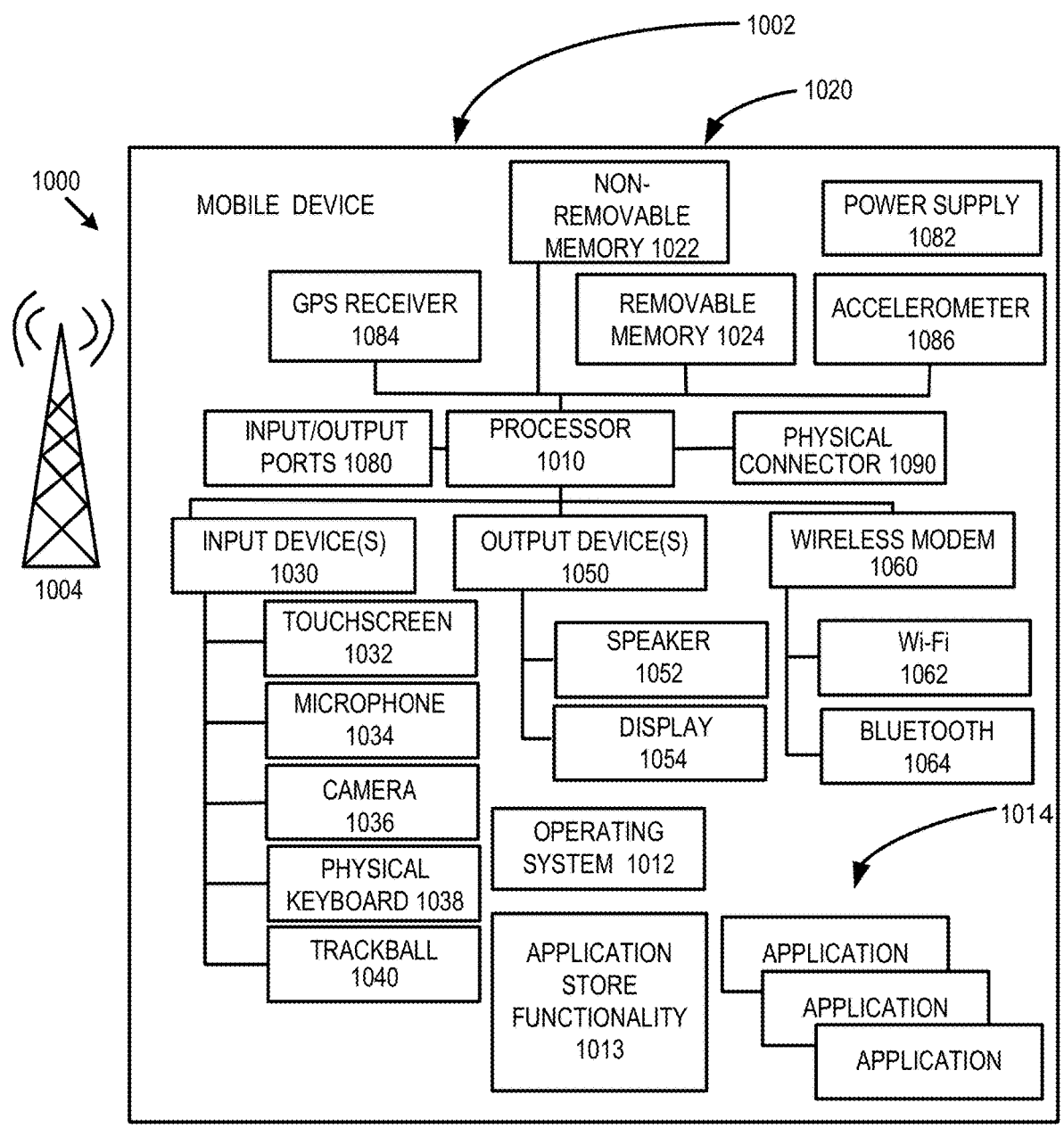
FIG. 10 is an example mobile device that can be used in conjunction with the technologies described herein.

FIG. 10 is a system diagram depicting an example mobile device 1000 including a variety of optional hardware and software components, shown generally at 1002. Any components 1002 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1004, such as a cellular, satellite, or other network.

The illustrated mobile device 1000 can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components 1002 and support for one or more application programs 1014. The application programs can include common mobile computing applications (e.g., email applications, calendars, contact managers, web browsers, messaging applications), or any other computing application. Functionality 1013 for accessing an application store can also be used for acquiring and updating application programs 1014.

The illustrated mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014. Example data can include web pages, text, images, sound files, video data, or other data sets to be sent to and/or received from one or more network servers or other devices via one or more wired or wireless networks. The memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1000 can support one or more input devices 1030, such as a touchscreen 1032, microphone 1034, camera 1036, physical keyboard 1038 and/or trackball 1040 and one or more output devices 1050, such as a speaker 1052 and a display 1054. Other possible output devices (not shown) can include piezoelectric or other haptic output devices. Some devices can serve more than one input/output function. For example, touchscreen 1032 and display 1054 can be combined in a single input/output device.

The input devices 1030 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1012 or applications 1014 can comprise speech-recognition software as part of a voice user interface that allows a user to operate the device 1000 via voice commands. Further, the device 1000 can comprise input devices and software that allows for user interaction via a user's spatial gestures, such as detecting and interpreting gestures to provide input to a gaming application.

A wireless modem 1060 can be coupled to an antenna (not shown) and can support two-way communications between the processor 1010 and external devices, as is well understood in the art. The modem 1060 is shown generically and can include a cellular modem for communicating with the mobile communication network 1004 and/or other radio-based modems (e.g., Bluetooth 1064 or Wi-Fi 1062). The wireless modem 1060 is typically configured for communication with one or more cellular networks, such as a GSM network for data and voice communications within a single cellular network, between cellular networks, or between the mobile device and a public switched telephone network (PSTN).

The mobile device can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components 1002 are not required or all-inclusive, as any components can be deleted and other components can be added.

Cloud-Supported Environment

While a cloud connection is not required for establishing the peer-to-peer network described herein, a cloud-supported environment may be used with the techniques described herein, particularly but not exclusively for storing changes to a given copy of a digital document for later use.

Figure 11:
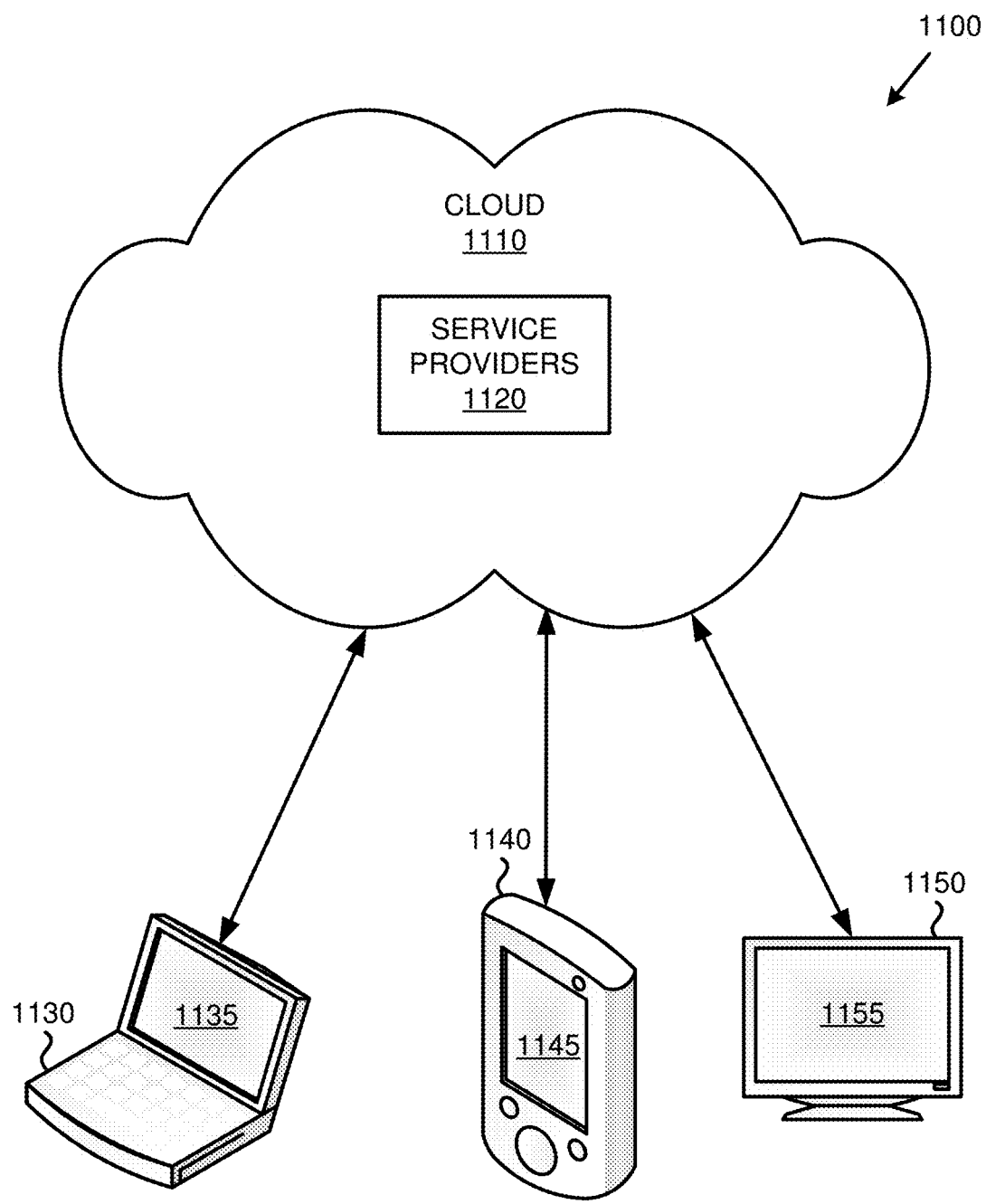
FIG. 11 is an example cloud-support environment that can be used in conjunction with the technologies described herein.

FIG. 11 illustrates a generalized example of a suitable cloud-supported environment 1100 in which described embodiments, techniques, and technologies may be implemented. In the example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130, 1140, 1150) while other tasks (e.g., storage of data to be used in subsequent processing) can be performed in the cloud 1110.

In example environment 1100, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, and the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, 1150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touchscreen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smartphones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 9, computer-readable storage media include memory 920 and 925, and storage 940. By way of example and with reference to FIG. 10, computer-readable storage media include memory and storage 1020, 1022, and 1024. The term computer-readable storage media does not include signals and carrier waves. In addition, the term computer-readable storage media does not include communication connections, such as 970, 1060, 1062, and 1064.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the invention is defined by the following claims. We therefore claim as our invention all that comes within the scope and spirit of these claims.

We claim:

1. A computing device comprising:
    a processing unit; and
    a computer-readable medium storing computer-executable instructions for causing the processing unit to perform operations for synchronizing annotations between computing devices, the operations comprising:
        creating a peer-to-peer network connection from the computing device to a plurality of other computing devices;
        displaying a fixed digital document;
        receiving a first annotation to the fixed digital document, wherein the first annotation is anchored to a first specific location of the fixed digital document;
        receiving a second annotation to the fixed digital document, wherein:
            the second annotation is anchored to a second specific location of the fixed digital document, and
            the second annotation is an unshared annotation that is not shared with and synchronized at the plurality of other computing devices;
        displaying the first annotation and the second annotation with the fixed digital document;
        streaming, via a first data stream over the peer-to-peer network connection, navigation instructions to the plurality of other computing devices, wherein the navigation instructions cause the plurality of other computing devices to display a particular portion of the fixed digital document; and
        streaming, via a second data stream over the peer-to-peer network connection, the first annotation to the plurality of other computing devices, wherein the first annotation is synchronized, in real-time, at the plurality of other computing devices to corresponding fixed digital documents displayed by the plurality of other computing devices.

2. The computing device of claim 1 wherein the first annotation comprises either highlighting added to digital text or electronic ink input.

3. The computing device of claim 1 wherein the first annotation is streamed via the peer-to-peer network connection using a user datagram protocol (UDP).

4. The computing device of claim 1 wherein the plurality of other computing devices synchronize the first annotation, in real-time, by adjusting display viewports of the corresponding fixed digital documents to match the first specific location at which the first annotation is anchored and displaying the first annotation.

5. The computing device of claim 1 wherein the fixed digital document is a portable document format (PDF) document.

6. The computing device of claim 1 wherein the fixed digital document is an Open XML Paper Specification (OpenXPS) document.

7. The computing device of claim 1 wherein creating the peer-to-peer network connection comprises sending a notification to the plurality of other computing devices inviting them to connect to a session.

8. The computing device of claim 7 wherein creating the peer-to-peer network connection further comprises receiving an indication from one or more of the plurality of other computing devices that the invitation to connect to a session is accepted.

9. The computing device of claim 1 wherein streaming the first annotation comprises:
   serializing the first annotation into serialized data of a data format configured for transmission to the plurality of other computing devices, and
   streaming the serialized first annotation to the plurality of other computing devices.

10. The computing device of claim 9 wherein the serialized data comprises data representing:
    an identification of the fixed digital document,
    a page number of a page on which the first annotation is made,
    a type of annotation,
    a location of the annotation on the page, and
    a size of the annotation.

11. The computing device of claim 1, the operations further comprising synching the first annotation to a cloud server connected to the computing device.

12. A method, implemented by a computing device, for synchronizing annotations to fixed digital documents between computing devices, the method comprising:
    creating a peer-to-peer network connection from the computing device to a plurality of other computing devices;
    displaying a fixed digital document;
    receiving a first annotation to the fixed digital document, wherein the first annotation is anchored to a first specific location of the fixed digital document;
    receiving a second annotation to the fixed digital document, wherein:
      the second annotation is anchored to a second specific location of the fixed digital document, and
      the second annotation is an unshared annotation that is not shared with and synchronized at the plurality of other computing devices;
    displaying the first annotation and the second annotation with the fixed digital document;
    streaming, via a first data stream over the peer-to-peer network connection, navigation instructions to the plurality of other computing devices, wherein the navigation instructions cause the plurality of other computing devices to display a particular portion of the fixed digital document; and
    streaming, via a second data stream over the peer-to-peer network connection, the first annotation to the other computing devices, wherein the first annotation is synchronized, in real-time, at the other computing devices to corresponding fixed digital documents displayed at the other computing devices.

13. The method of claim 12 wherein streaming the first annotation comprises:
    serializing the first annotation into serialized data of a data format configured for transmission to the plurality of other computing devices, and
    streaming the serialized first annotation to the plurality of other computing devices, wherein the serialized data comprises data representing:
      an identification of the fixed digital document,
      a page number of a page on which the first annotation is made,
      a type of annotation,
      a location of the first annotation on the page, and
      a size of the first annotation.

14. The method of claim 12 wherein streaming the first annotation further comprises sending data representing:
    a scaling factor for the display of a page on which the first annotation is made, and
    a scrolling location for a portion of the page on which the first annotation is made.

15. The method of claim 12, wherein streaming the first annotation comprises sending data representing a first layer of the fixed digital document on which the first annotation is entered, wherein the first layer is distinct from a second layer of the fixed digital document on which additional annotations may be entered, and wherein the second layer comprises a layer wherein annotations may be received on one or more of the plurality of other computing devices.

16. A computer-readable storage medium storing computer-executable instructions for execution on a computing device to perform operations for synchronizing annotations between computing devices, the operations comprising:
    creating a peer-to-peer network connection from the computing device to a plurality of other computing devices;
    displaying a fixed digital document;
    receiving a first annotation to the fixed digital document, wherein the first annotation is anchored to a first specific location of the fixed digital document;
    receiving a second annotation to the fixed digital document, wherein:
      the second annotation is anchored to a second specific location of the fixed digital document, and
      the second annotation is an unshared annotation that is not shared with and synchronized at the plurality of other computing devices;
    displaying the first annotation and the second annotation with the fixed digital document;
    streaming, via a first data stream over the peer-to-peer network connection, navigation instructions to the plurality of other computing devices, wherein the navigation instructions cause the plurality of other computing devices to display a particular portion of the fixed digital document; and
    streaming, via a second data stream over the peer-to-peer network connection, the first annotation to the other computing devices, wherein the first annotation is synchronized, in real-time, at the other computing devices to corresponding fixed digital documents displayed at the other computing devices.

17. The computer-readable storage medium of claim 16, wherein the first annotation comprises highlighting one or more words in the fixed digital document.

18. The computer-readable storage medium of claim 16 wherein the first annotation comprises digital ink input on the fixed digital document.

19. The computer-readable storage medium of claim 16 wherein the first annotation is positioned on a first page of the fixed digital document, and wherein streaming the first annotation comprises sending an instruction configured to cause the plurality of other computing devices to display the first page of the fixed digital document.

20. The computer-readable storage medium of claim 19, wherein the first annotation further comprises a second annotation positioned on a second page of the fixed digital document, and wherein streaming the first annotation comprises sending an instruction configured to cause the plurality of other computing devices to display the second page of the fixed digital document.

\* \* \* \* \*